United States Patent Office 3,030,428
Patented Apr. 17, 1962

3,030,428
HYDROXYBENZYL ALCOHOL PRODUCTION
Rupert C. Morris, Berkeley, and Albert L. Rocklin, Walnut Creek, Calif., assignors to Shell Oil Company, a corporation of Delaware
No Drawing. Filed July 30, 1959, Ser. No. 830,475
10 Claims. (Cl. 260—624)

This invention relates to alkylated hydroxybenzyl alcohols and to a process for preparing them. More specifically, the invention relates to the preparation of such alkylated hydroxybenzyl alcohols from alkyl phenols and formaldehyde under particular reaction conditions.

Although the dialkyl hydroxybenzyl alcohols are known, they have heretofore been prepared by such cumbersome and relatively expensive methods as the preparation and oxidation of the dialkylated cresol to the corresponding dialkyl hydroxybenzaldehyde, and the reduction of the benzaldehyde to the desired alcohol. While these benzyl alcohols have been found to be useful intermediates in the preparation of phenolic antioxidants, the relatively high cost of the starting alkylated cresol and the extensive processing required to produce the benzyl alcohols therefrom have restricted their commercial applications.

Among the objects of this invention is the provision of a process for preparing dialkyl hydroxybenzyl alcohols directly from dialkyl phenols. Another object is the provision of a process for preparing these benzyl alcohols economically and in high yield. Still a further object is the provision of a process for preparing these benzyl alcohols at low temperatures and with inexpensive and readily available reactants, thus avoiding the necessity for elaborate process equipment. Other objects will be apparent from the following description of the invention.

These and other objects are accomplished by reacting together a phenol having a replaceable hydrogen atom on at least one of the ortho and para ring carbon atoms and formaldehyde, in the presence of an alcohol having at least two carbon atoms directly connected to the hydroxylic carbon atom, at a temperature below about 25° C., in the presence of a catalytic amount of a miscible base, and separating the hydroxybenzyl alcohol from the reaction mixture. While phenol itself may be employed as the starting phenol, it has been found that phenols having at least one and preferably two alkyl substituents are more suitable in that fewer side reactions take place and higher yields of the hydroxybenzyl alcohol product are obtained.

The invention can best be understood by the following detailed consideration of the reactants and conditions by which the hydroxybenzyl alcohols are produced. The structure of these alcohols will, of course, be determined by the nature of the starting phenolic reactant.

In general, any monohydroxybenzene compound having at least one replaceable hydrogen atom on the ring carbon atoms ortho and para to the hydroxyl substituent will serve as the starting phenol. It has been found, however, that the more hindered the hydroxyl substituent is the better the reaction proceeds. The preferred reactants are therefore those wherein the monohydroxybenzene compound has at least one hydrocarbyl substituent ortho to the hydroxyl group, as in the case of o-cresol. Since the products of the process described are principally useful as antioxidants or as intermediates in the preparation of antioxidants, it is desirable that the hydrocarbyl substituent be an alkyl or cycloalkyl group sufficiently large to offer some degree of hindrance to access to the phenolic hydroxyl group. It is thus desirable that the hydrocarbyl substituent be branched on the alpha carbon atom and have at least three carbon atoms and, preferably, not more than eight. Suitable o-hydrocarbyl phenols meeting these requirements include secondary alkyl-substituted phenols such as o-isopropyl phenol, o-sec-butyl phenol, o-sec-amyl phenol and o-cyclohexyl phenol; while suitable tertiary hydrocarbyl phenols include o-tert-butyl phenol and o-tert-amyl phenol.

Most preferred phenolic reactants in the process of this invention are dialkyl phenols wherein the phenol has a replaceable hydrogen atom on one of the ortho and para ring carbon atoms, and a hydrocarbyl substituent on each of the remaining two of said carbon atoms. Preferably, at least one of these hydrocarbyl substituents is branched on the alpha carbon atom and has from 3 to 8 carbon atoms. In view of the importance of having the hydroxyl group sterically hindered, the branched hydrocarbyl substituent is most desirably that ortho to the hydroxyl group. It will be obvious from this description that the substituents need not both be the same hydrocarbyl radical and that both 2,4-di-substituted phenols and 2,6-di-substituted phenols are included. Appropriate phenols are represented by 2,6-dimethyl phenol, 2-methyl-4-ethyl phenol, 2,6-di-n-butyl phenol, and 2-ethyl-4-propyl phenol; while the preferred members of this class are typified by such compounds as 2-isopropyl-6-methyl phenol, 2-sec-butyl-4-methyl phenol, 2,6-di-tert-butyl phenol, 2-methyl-6-cyclohexyl phenol, 2-cyclohexyl-4-methyl phenol, 2-isopropyl-4-tert-butyl phenol, and the like. Such particularly preferred phenols may be described by the structures

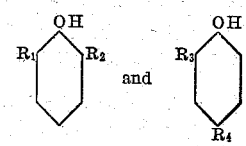

wherein $R_1$, $R_2$, $R_3$ and $R_4$ are hydrocarbyl radicals, preferably alkyl or cycloalkyl radicals having from 3 to 8 carbon atoms, and at least one of which is branched on the alpha carbon atom. While in the following discussion the process of invention will be described in terms of the reaction of formaldehyde with 2,6-dialkylphenols to yield 3,5-dialkyl-4-hydroxybenzyl alcohols, it will be clear that the other phenols described are also included within the scope of the invention.

The hydroxybenzyl alcohol products of the process of this invention are prepared by reacting a phenol of the type described with formaldehyde in a particular type of solvent and in the presence of a catalytic amount of a basic compound, preferably at low temperature, so that one of the following types of reaction will take place.

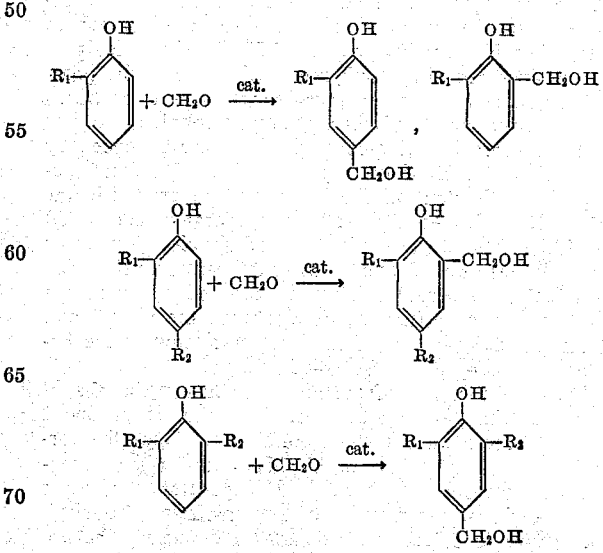

The fact that the reactions described take place at all in alcohol solution is unexpected in view of the teaching of Kharasch and Joshi, J. Org. Chem. 22, 1435 (1957), that when 2,6-dialkyl phenols react with formaldehyde in the presence of basic catalysts in alcohols other than methanol, only methane bisphenols are produced.

The use of substantially anhydrous formaldehyde is an important feature of the process. Anhydrous formaldehyde can be employed as a gas, in the form of monomeric formaldehyde, or it may be generated from such formaldehyde polymers as the polyoxymethylene glycols, particularly the commercial mixture called paraformaldehyde. Even in the commercial form, paraformaldehyde may be obtained containing less than about 4% water and having the appearance of a colorless solid. The gas and the solid are equally soluble in the alcohol solvent used in the process.

The phenol and the formaldehyde may be present in the reaction mixture in any convenient proportions for reaction to take place. A ratio of at least one mole of the phenol per mole of formaldehyde is preferred, but the reaction may be conducted with a molar excess of either reactant. When the phenol and formaldehyde are reacted in a molar ratio in excess of 1:1, excellent yields of the benzyl alcohol are obtained, and excess phenol may be recycled. Since no material increase in yield is achieved by using more than about 5 moles of phenol per mole of formaldehyde, a maximum phenol/formaldehyde ratio of 5:1 is regarded as the highest economically desirable.

Satisfactory yields of the benzyl alcohol product are also obtained when molar excesses of formaldehyde are employed, and such ratios of about 5 moles of formaldehyde per mole of phenol can be conveniently employed without imparing the amount of product obtained in the reaction.

Condensation of the phenol and the formaldehyde with consequent production of the benzyl alcohol without the formation of undesirable by-products is accomplished by conducting the reaction in a particular type of alcoholic medium. The medium is a monohydric alcohol having at least two carbon atoms connected directly to the hydroxylic carbon atom; such alcohols are thus secondary and tertiary alcohols, and preferably those having no more than twelve carbon atoms in the molecule. Exemplary secondary alcohols include isopropanol, sec-butyl alcohol, sec-amyl alcohol, cyclohexanol, methyl phenyl carbinol, methylisopropyl carbinol, ethyl-tert-butyl carbinol, and the like; while representative tertiary alcohols are tert-butyl alcohol, tert-amyl alcohol, dimethyl ethyl carbinol, triethyl carbinol, etc. These alcohols include, of course, those having melting points below about 25° C. and, preferably, below about −15° C. and those which, in admixture with the other components of the reaction mixture give solutions whose freezing points are below about 25° C. Best yields of the product benzyl alcohols are obtained when the process is conducted in a tertiary alcohol solvent, of which the preferred member is tertiary butyl alcohol.

The hydroxybenzyl alcohol products are produced by reacting a phenol of the type described with formaldehyde in a suitable alcohol solvent at a temperature below about 100° C. At temperatures in excess of about 25° C., however, the production of undesirable by-products may become appreciable; at lower temperatures the yield of the desired benzyl alcohol is enhanced. Best results are obtained when the reaction between the phenol and the formaldehyde is conducted at some temperature between about −15° C. and +15° C.

During the course of the reaction between the phenol and the formaldehyde the benzyl alcohol is produced without accompanying water formation. Since the formation of benzyl ethers or bisphenols under such reaction conditions is accompanied by the generation of water in proportion to the amounts of these materials produced, the failure to detect water demonstrates clearly the absence of these two types of materials. The failure to detect water is in a system in which deliberately added small increments of water were readily detectable by infra-red spectroscopy.

An important feature of the invention is the conduct of the reaction in a substantially anhydrous reaction system. By "substantially anhydrous" is meant a reaction system wherein the total amount of water present is no more than about 5% by weight, based on the reaction mixture. When the amount of water in the system exceeds this, both the reaction rate and the yield of product are reduced to undesirably low values.

The presence of a basic catalyst miscible with the reaction system is required for the conduct of the process. Catalysts meeting these requirements include alkali metal hydroxides, such as potassium hydroxide, sodium hydroxide, lithium hydroxide, and the like; alkali metal alcoholates, as, for example, potassium tert. butoxide and sodium methoxide; and quaternary ammonium hydroxides. These compounds are required in only catalytic quantity. For example, amounts of potassium tert. butoxide as small as 0.002 mole per mole of the phenol are effective to catalyze the reaction, and amounts as high as 0.2 mole on the same basis may be conveniently employed. Preferred range for the catalysts noted is between about 0.0167 and 0.05 mole of miscible base per mole of phenol.

When the phenolic reactant and formaldehyde are reacted in a suitable alcohol in the presence of a miscible basic catalyst at a temperature below about 25° C., the product hydroxybenzyl alcohol is obtained in high yield, in excess of 90%, based on the phenol. Depending on the reaction conditions, contact times of from about five minutes to in excess of ten hours have been found to produce excellent results. The process may readily be conducted in a batchwise, semibatch or continuous manner and in conventional equipment, providing the temperature of the reaction system is maintained in the proper range.

The product benzyl alcohol is easily separated from the reactant mixture by such means as distillation, extraction and other methods obvious to those skilled in the chemical processing art. For example, the solvent alcohol may be easily taken off overhead under reduced pressure without the necessity of raising the temperature of the reaction mixture.

The preferred method for separating the benzyl alcohol is to take advantage of its insolubility in water by mixing the reaction mixture with sufficient water to precipitate the product. This method has the advantage that the hydroxybenzyl alcohol precipitates as a clean white crystalline solid or insoluble organic liquid which may be readily recovered. The basic catalyst and any unreacted formaldehyde, which are extracted into the aqueous phase, remain in solution and do not noticeably contaminate the precipitated 3,5-dialkyl-4-hydroxybenzyl alcohol product. The unreacted phenolic reactant usually precipitates with the product, but, as will be seen, can be conveniently separated therefrom by washing with suitable solvents or by other methods known to those skilled in the art. The water serves the function of materially reducing the rate of or entirely stopping the condensation reaction by removing the basic catalyst from the organic phase.

The reaction may also be terminated by neutralizing the basic catalyst in situ. For example, acetic acid may be added to the reaction mixture until the latter is neutral, or carbon dioxide gas may be bubbled through the mixture. When alkali metal base catalysts are used, the resulting salts are water-soluble and are readily washed from the product in the course of recovering it. The use of carbon dioxide gas to neutralize the catalyst is particularly attractive since there is no risk of rendering the reaction mixture so acidic that the product benzyl alcohol is contaminated.

The separation of the product may be simply and effectively conducted by adding water to the alkanol mixture until no more benzyl alcohol precipitate forms. The amount of water required will, of course, depend on the solubility of the particular hydroxybenzyl alcohol being prepared, but is, in general, an amount approximately equal in volume to the volume of the alkanol solution. For example, when the process is being conducted on a continuous basis in a pipe reactor, the separation may be accomplished by continuously adding to the effluent solution a gallon of water per minute for every gallon per minute of alkanol solution handled. Subsequent washes of the organic phase with additional amounts of water will, of course, result in the precipitation of additional product.

Since the product benzyl alcohol generally forms relatively coarse, free-flowing crystals, the crystals may easily be recovered by filtration or centrifugation and rewashed or otherwise treated for further purification. The solid product recovered from the first water separation is extremely clean and free from contamination, as is evidenced both by its brilliant sparkling white color and its excellent stability upon standing. The benzyl alcohol crystals may easily be dried in treated air or, since they are relatively insoluble in hydrocarbons, by washing with such paraffins as n-pentane. Following the addition of water, the distribution of the benzyl alcohol between the aqueous and organic phases is such that some of the benzyl alcohol remains dissolved in the organic phase. Because this dissolved product is substantially insoluble in paraffins, as has been noted, it may be precipitated by addition of such hydrocarbons as isopentane, cyclohexane, hexane or "petroleum ether" to the organic phase.

The product hydroxybenzyl alcohols produced by this process are, as has been noted, white crystalline solids or clear liquids, relatively insoluble in water and in some hydrocarbons but readily soluble in polar organic liquids. Their unique structure gives them useful antioxidant properties. For example, 3,5-di-tert-butyl-4-hydroxybenzyl alcohol is sufficiently soluble in gasoline to afford a gasoline composition comparable in stability to gasolines stabilized with such well-known antioxidants as 2,6-di-tert-butyl phenol and 2,4-dimethyl-6-tertbutyl phenol.

Moreover, the benzyl alcohols may be readily reacted in a variety of manners to produce conventional antioxidants. For example, with the aid of certain catalysts, the 3,5-dialkyl-4-hydroxybenzyl alcohol product may be reduced with hydrogen under moderate conditions of heat and pressure to yield 2,6-dialkyl-4-methyl phenols by the reaction

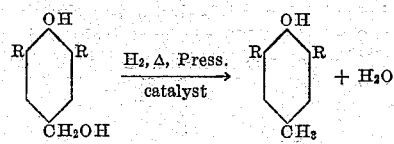

Thus, when a methanol solution of the compound 3,5-di-tert-butyl-4-hydroxybenzyl alcohol is contacted with copper chromium oxide catalyst at a temperature between about 100–200° C. and a hydrogen pressure between about 100–3500 p.s.i.g., the well-known antioxidant 2,6-di-tert-butyl-4-methyl phenol is obtained quantitatively. In a similar manner 2-tert-butyl-4,6-dimethyl phenol may be prepared by heating a dioxane solution of 2-tert-butyl-5-methyl-4-hydroxybenzyl alcohol under superatmospheric hydrogen pressure in contact with Raney nickel.

Because of the cleanliness and purity of the benzyl alcohol, the 2,6-dialkyl-4-methyl phenols produced by hydrogenolysis thereof may be employed as antioxidants in most applications without additional treatment. Reduction of the 3,5-dialkyl-4-hydroxybenzyl alcohol to 3,5-dialkyl-4-methyl phenol without separation of the benzyl alcohol from the reaction mixture of the process is also readily effected, particularly when the reaction has been conducted with anhydrous reagents.

To illustrate further the process of the invention, the following specific examples are set forth. It should be understood, however, that these examples are merely illustrative and are not to be regarded as limitations to the appended claims, since the basic teachings thereof may be varied at will as will be understood by those skilled in the art. In the examples, the proportions are expressed in parts by weight unless otherwise noted.

EXAMPLE I

*Preparation of 3,5-Di-T-Butyl-4-Hydroxybenzyl Alcohol at 20° C.*

In a reaction vessel equipped with stirring means and a thermometer and purged with nitrogen were placed 53.5 ml. of a 7.5% solution of formaldehyde in anhydrous tert-butyl alcohol (0.140 mole $CH_2O$), 50 ml. of a 500 g/l. solution of 2,6-di-tert-butylphenol in anhydrous tert-butyl alcohol (0.128 mole 2,6-di-tert-butylphenol), and 14 ml. of a 50 g./l. solution of potassium tert-butoxide in anhydrous tert-butyl alcohol (0.006 mole), all solutions being cooled to 20° C. prior to mixing. The temperature of the mixture was maintained at 20° C. by cooling in an ice bath.

At repeated intervals after mixing 5 ml. samples of the reaction mixture were taken and immediately poured into about 25 ml. of cold water. The resulting mixtures each separated into an oily organic layer, which promptly solidified, and an aqueous layer. The recovered solids were blotted free of water, rewashed, stirred with isopentane, then filtered and washed with more isopentane, then air dried. In each case, the resulting product was a sparkling white crystalline solid which, upon analysis, proved to be 3,5-di-tert-butyl-4-hydroxybenzyl alcohol.

The data obtained in this manner showed that a 61% conversion of the starting phenol to the benzyl alcohol product was obtained in 10 minutes.

EXAMPLE II

Using the techniques described in Example I, experiments employing the following proportions of 2,6-di-tert-butylphenol, formaldehyde and catalyst were performed in which the following results were obtained.

| Molar Proportions | | | Temperature of Reaction ° C. | Conversion (based on phenol), Percent | Yield (based on phenol) Percent | Remarks |
| --- | --- | --- | --- | --- | --- | --- |
| 2,6-Di-t-Butyl Phenol | Formaldehyde | Catalyst | | | | |
| 1.0 | 1.05 | K-t-butoxide, 1/20 mol. | −10 | 45 | 89 | No bisphenol produced. |
| 1.0 | 0.75 | K-t-butoxide, 1/30. | 13.1 | 43 | 90.5 | |
| 1.0 | 0.75 | KOH, 1/44 | 12.5 | 67 | 82 | Unreacted phenol recycled 3 times without purification. |
| 1.0 | 0.33 | KOH, 1/44 | 10 | | 90 | |
| 1.0 | 0.75 | K-t-butoxide, 1/40 | 14 | 53 | 87.5 | |
| 1.0 | 0.50 | KOH, 1/60 | 10 | | [1] 78 | |
| 1.0 | 0.573 | KOH, 1/44 | 12.5 | 49 | 84.7 | |

[1] Based on $CH_2O$.

EXAMPLE III

An experiment was conducted in which unreacted 2,6-di-tert-butylphenol was recycled without separation of unprecipitated product.

To a large flask was added 618 g. (3.00 moles) of 2,6-di-tert-butylphenol and 472 g. of a 14.3% w. solution of formaldehyde (2.25 moles) in tert.-butyl alcohol. This was cooled to 12.5° C., and 136 g. of 2.8% w. potassium hydroxide in tert-butyl alcohol (0.068 mole) added. The proportions of phenol:$CH_2O$:base were thus 1:0.75:0.022.

The resulting homogeneous mixture was maintained with stirring at 12.5° C. for 25 minutes. At the end of that time 1.5 liters of water was added and the mixture stirred for ten minutes. After the two phases separated, the aqueous phase was removed, and the partially crystallized organic material further extracted with water then stirred with one liter of isopentane and the product filtered from the isopentane solution. Another 850 ml. isopentane were used to wash the product benzyl alcohol, of which there was obtained 295 g.

Vacuum removal of the isopentane from the combined filtrate and washings left an organic solution to which was then added 258 grams of 2,6-di-tert-butylphenol, 450 ml. of 15% w. formaldehyde in tert-butyl alcohol and 138 g. 2.8% potassium hydroxide in tert-butyl alcohol. The 25-minute reaction cycle at 12.5° C. was repeated and at the end of that time the product was once again recovered by water precipitation and by isopentane washing. The isopentane was evaporated from the filtrate and washings, and additional 2,6-di-tert-butylphenol, formaldehyde and KOH added, and the cycle repeated twice more. The data regarding the four cycles are tabulated below:

|  | Cycle | | | | Total |
| --- | --- | --- | --- | --- | --- |
|  | 1 | 2 | 3 | 4 |  |
| 2,6-Di-t-butylphenol added, g. | 618 | 258 | 260 | 235 | 1,371 |
| Total phenol in stream, g. | 618 | 513 | 461 | 426 |  |
| 3,5-Di-t-butyl-4-hydroxybenzyl alcohol recovered, g. | 295.5 | 264 | 252 | 261 | 1,072.5 |

From the data obtained, it was calculated that the overall conversion, based on the 2,6-di-tert-butylphenol, was 67.2%, and the total yield of 3,5-di-tert-butyl-4-hydroxyphenol on the same basis was 82%.

EXAMPLE IV

To a flask was charged 700 g. of 2,6-di-tert-butylphenol, 408.5 g. of 14.3% w. formaldehyde in tert-butyl alcohol and 170 g. of 2.4% w. KOH in tertiary butyl alcohol yielding a mixture having the phenol:$CH_2O$:KOH molar ratio 1.0:0.573:0.022. The homogeneous reaction mixture was maintained with stirring at 12.5° C. for thirty minutes.

At the end of that time gaseous carbon dioxide was passed rapidly into the solution for several minutes to neutralize the basic catalyst. The tert-butyl alcohol was then distilled off at 60° C. and 180 mm. Hg, the last traces of alcohol being removed by heating the mixture to 134° C. The residue was then stirred up in 500 ml. hexane and the resulting crystals of the product 3,5-di-tert-butyl-4-hydroxybenzyl alcohol washed in additional hexane and in water. The hexane was distilled at reduced pressure and the residue therefrom washed in isopentane to yield additional product, the total weight of product being 356 g.

The yield of the benzyl alcohol, based on the 2,6-di-tert-butyl phenol, was 76.5% and the conversion of the phenol 57.5%.

EXAMPLE V

To a solution of 17.8 g. of 2,6-di-isopropylphenol in 21 g. of 14.3% w. formaldehyde in tert-butyl alcohol under nitrogen was added 10 ml. of 2.4% w. KOH in tert-butyl alcohol. The resulting molar ratios of the phenol:formaldehyde:KOH were 1:1:0.033. The solution was allowed to stand under nitrogen overnight at about 25° C., after which it was diluted with 400 ml. water. Methylene chloride was added to increase the density of the organic layer, and the latter then separated from the aqueous phase. The aqueous phase was washed with additional methylene chloride, the total amount of methylene chloride used being about 185 ml. The methylene chloride solutions were combined and filtered, and the methylene chloride solvent then distilled off at 35° C., the last traces being removed at 1.5 mm. The residue was 19.3 g. of a light amber oil.

The residue was washed with successive portions of isopentane to remove unreacted 2,6-di-isopropylphenol, leaving a residue which, after being heated under reduced pressure to remove traces of solvent, proved to be 9.1 g. of 3,5-di-isopropyl-4-hydroxybenzyl alcohol.

EXAMPLE VI

To a flask purged with nitrogen were added 18.3 g. (0.15 mole) 2,6-dimethylphenol, 42 g. (0.2 mole) 14.3% w. formaldehyde in tert-butyl alcohol, and 15 ml. (0.005 mole) 2.4% w. KOH in tert-butyl alcohol. The phenol:formaldehyde:KOH molar ratios were therefore 1:1.33:0.033.

This mixture was allowed to stand overnight at about 20° C. under nitrogen. To it was then added enough water to make a total of 500 ml., the mixture acidified with HCl, and the organic phase taken up in methylene chloride. The aqueous phase was extracted with two successive portions of methylene chloride, and the methylene chloride fractions combined. The methylene chloride was then stripped off in vacuo at 35° C. and the residue extracted with isopentane to leave an insoluble powdery white residue. Additional powdery white product was precipitated from the aqueous phase by further acidification. This was washed with isopentane.

The total yield of the 3,5-dimethyl-4-hydroxybenzyl alcohol obtained in this manner was 14.55 g., corresponding to a conversion based on the starting phenol of 64% and a yield on the same basis of 82%. Melting point of the product was 165–169° C., somewhat lower than the literature value of 175–176° C.

EXAMPLE VII

A solution of 3.3 g. of 2-t-butyl-4-methylphenol (0.02 mole) in 4.2 g. of 14.3% w. formaldehyde in tert-butyl alcohol (0.02 mole) was stirred at 24° C. under nitrogen, and to it was added 2 ml. of 2.4% w. KOH in tert-butyl alcohol (0.00067 mole). The system was maintained under nitrogen overnight, and to it was then added 250 ml. of water and sufficient HCl to neutralize the base.

The organic layer was taken up in 50 ml. methylene chloride, then separated from the aqueous phase and filtered. The filtrate was stripped off the methylene chloride solvent, the last traces being removed at 50° C. and 20 mm. Hg, leaving 3.90 g. of residue. This residue was distilled to yield 1.55 g. of a pure product having a melting point of 37–39.5° C. Infrared analysis showed the product to be 2-hydroxy-3-tert-butyl-5-methylbenzyl alcohol.

EXAMPLE VIII

A reaction flask purged with nitrogen was charged with 16.4 g. (0.10 mole) 2-methyl-4-tert-butylphenol, 21 g. (0.10 mole) 14% w. formaldehyde in tert-butyl alcohol, and 10 ml. of 2.4% w. potassium hydroxide in tert-butyl alcohol. The reaction mixture thus contained a phenol:formaldehyde:catalyst ratio of 1:1:0.033.

The mixture was maintained with stirring under nitrogen at 24° C. overnight, and in the morning 250 ml. of water and sufficient HCl to neutralize the base were added thereto. The product was recovered from the resulting mixture as in Example VII. After distilling off the methylene chloride and the unreacted phenol, 9.5 g. of product 2-hydroxy-3-methyl-5-tert-butylbenzyl alcohol was obtained.

EXAMPLE IX

A sample of 3,5-di-tert-butyl-4-hydroxybenzyl alcohol in methanol was hydrogenated over copper chromite catalyst at a maximum hydrogen pressure of 925 p.s.i.g. and a maximum temperature of 150° C. The final pressure at 150° C. was 570 p.s.i.g. The amount of copper chromite employed was 4% w., based on the hydroxybenzyl alcohol.

The catalyst was filtered from the methanol reaction mixture, and the solvent stripped from the mixture. In this way a 97.5% yield of 2,6-di-tert-butyl-4-methylphenol product was obtained.

By starting with 2,6-di-tert-butylphenol, formaldehyde and potassium hydroxide in a molar ratio of 1:2.2:0.015 in tert-butyl alcohol and conducting the reaction at 15° C. in the manner described in previous examples, a reaction mixture containing 3,5-di-tert-butyl-4-hydroxybenzyl alcohol was obtained. About 2 moles of water were added to this system and the system hydrogenated as above. From this mixture a 60% yield of 2,6-di-tert-butyl-4-methylphenol, based on the starting phenol, was recovered, demonstrating that good yields of the alkylated phenol product may be obtained without separation of the hydroxybenzyl alcohol.

Excellent yields of the 2,6-dialkyl-4-alkyl phenols can be obtained by hydrogenating the corresponding hydroxybenzyl alcohols over copper chromite or other hydrogenation catalysts at temperatures from about 100°–500° C. and hydrogen pressures in excess of 100 p.s.i.g. and preferably no greater than about 2000 p.s.i.g.

We claim as our invention:

1. A process for preparing a hydroxybenzyl alcohol which comprises forming a single phase substantially anhydrous liquid mixture comprising a phenol having a replaceable hydrogen atom on at least one of the ortho and para ring carbon atoms, formaldehyde, and an alkanol having at least two carbon atoms directly connected to the hydroxylic carbon atom, reacting together said phenol and formaldehyde at a temperature below about 25° C. in the presence of a catalytic amount of a miscible base, and separating the hydroxybenzyl alcohol from the reaction mixture.

2. A process for preparing a dialkyl hydroxybenzyl alcohol which comprises forming a single phase substantially anhydrous liquid mixture comprising a dialkyl phenol having a replaceable hydrogen atom on one of the ortho and para ring carbon atoms and alkyl substituents on each of the remaining two of said carbon atoms, formaldehyde, and a tertiary alkanol, reacting together said dialkyl phenol and formaldehyde at a temperature below about 25° C. in the presence of a catalytic amount of a miscible base, and separating the dialkyl hydroxybenzyl alcohol from the reaction mixture.

3. A process for preparing a dialkyl hydroxybenzyl alcohol which comprises forming a single phase substantially anhydrous liquid mixture comprising a dialkyl phenol having a replaceable hydrogen atom on one of the ortho and para ring carbon atoms, and alkyl substituents on the remaining two of said ring carbon atoms, one of the alkyl groups being branched on the alpha carbon atom and having from 3 to 8 carbon atoms, formaldehyde, and an alkanol having at least two carbon atoms directly attached to the hydroxylic carbon atom, reacting together said dialkyl phenol and formaldehyde at a temperature below about 25° C., in the presence of a catalytic amount of a miscible base, and separating the dialkyl hydroxybenzyl alcohol from the reaction mixture.

4. A process for preparing 3,5-dialkyl-6-hydroxybenzyl alcohol which comprises forming a single-phase substantially anhydrous liquid mixture comprising ortho, para dialkyl phenol having a replaceable hydrogen atom on the remaining ortho ring carbon atom, formaldehyde and an alkanol having at least two carbon atoms directly attached to the hydroxylic carbon atom, reacting together said dialkyl phenol and formaldehyde at a temperature below about 25° C., in the presence of a catalytic amount of a miscible base, and separating the 3,5-dialkyl-6-hydroxybenzyl alcohol from the reaction mixture.

5. A process for preparing 3,5-dialkyl-4-hydroxybenzyl alcohol which comprises forming a single-phase substantially anhydrous mixture comprising a 2,6-dialkyl phenol, formaldehyde and tertiary alkanol, reacting together said 2,6-dialkyl phenol and formaldehyde at a temperature below about 25° C., in the presence of a catalytic amount of a miscible base, and separating the 3,5-dialkyl-4-hydroxybenzyl alcohol from the mixture.

6. A process for preparing 3,5-dialkyl-4-hydroxybenzyl alcohol which comprises forming a single-phase substantially anhydrous mixture comprising a 2,6-dialkyl phenol wherein at least one of the alkyl substituents is connected to the phenyl nucleus by a branched carbon atom, formaldehyde and tertiary alkanol, reacting together said 2,6-dialkyl phenol and formaldehyde at a temperature between about −15° C. and 25° C., in the presence of a catalytic amount of a miscible base, and separating the 3,5-dialkyl-4-hydroxybenzyl alcohol from the mixture.

7. The process of claim 6 wherein the tertiary alkanol is tertiary butyl alcohol.

8. A process for preparing 3,5-di-t-butyl-4-hydroxybenzyl alcohol which comprises forming a single-phase substantially anhydrous mixture of 2,6-di-t-butyl phenol and formaldehyde in tertiary alkanol, reacting said 2,6-di-t-butyl phenol and formaldehyde at a temperature between about −15° C. and 25° C., in the presence of a miscible alkali metal base, and separating the 3,5-dialkyl-4-hydroxybenzyl alcohol from the mixture.

9. A process for preparing 3,5-dialkyl-4-hydroxybenzyl alcohol which comprises reacting together a 2,6-dialkyl phenol wherein at least one of the alkyl substituents is connected to the phenyl nucleus by a branched carbon atom, and the formaldehyde in a tertiary alkanol, at a temperature below about 25° C. under substantially anhydrous conditions in the presence of a catalytic amount of a miscible alkali metal base, and precipitating the 3,5-dialkyl-4-hydroxybenzyl alcohol by adding water to the reaction mixture.

10. A process for preparing 3,5-di-t-butyl-4-hydroxybenzyl alcohol which comprises reacting together 2,6-di-tert-butyl phenol and formaldehyde in tertiary butyl alcohol at a temperature below about 25° C. under substantially anhydrous conditions in the presence of at least about 0.005 mole of a miscible alkali metal base per mole of phenol, and precipitating the 3,5-di-t-butyl-4-hydroxybenzyl alcohol by adding water to the reaction mixture.

References Cited in the file of this patent

UNITED STATES PATENTS

| | | |
|---|---|---|
| 2,710,305 | Martin | June 7, 1955 |
| 2,732,406 | Lambert | Jan. 24, 1956 |
| 2,792,428 | Pikl | May 14, 1957 |
| 2,838,571 | Filbey | June 10, 1958 |
| 2,841,624 | Norton et al. | July 1, 1958 |
| 2,909,568 | Gleim | Oct. 20, 1959 |

OTHER REFERENCES

Miller et al.: Jour. Amer. Chem. Soc., vol. 76 (1954), pages 296–7 (2 pages).

Kharasch et al.: Jour. Organic Chem., vol. 22 (1957), pages 1435–38 (4 pages).